US010064229B2

(12) United States Patent
Yang et al.

(10) Patent No.: US 10,064,229 B2
(45) Date of Patent: Aug. 28, 2018

(54) DEVICE-TO-DEVICE COMMUNICATION METHOD AND MOBILE DEVICE USING THE SAME

(71) Applicant: Electronics and Telecommunications Research Institute, Daejeon (KR)

(72) Inventors: Mi Jeong Yang, Daejeon (KR); Soon Yong Lim, Daejeon (KR); Hyeong Jun Park, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 173 days.

(21) Appl. No.: 14/068,582

(22) Filed: Oct. 31, 2013

(65) Prior Publication Data

US 2014/0119306 A1    May 1, 2014

(30) Foreign Application Priority Data

Oct. 31, 2012  (KR) .................. 10-2012-0122065

(51) Int. Cl.
| | |
|---|---|
| *H04W 76/14* | (2018.01) |
| *H04W 76/02* | (2009.01) |
| *H04W 72/08* | (2009.01) |
| *H04L 1/18* | (2006.01) |
| *H04L 1/00* | (2006.01) |

(52) U.S. Cl.
CPC ........... *H04W 76/14* (2018.02); *H04L 1/1819* (2013.01); *H04L 1/1854* (2013.01); *H04L 1/1887* (2013.01); *H04L 1/1896* (2013.01); *H04W 72/085* (2013.01); *H04W 76/023* (2013.01); *H04L 2001/0092* (2013.01)

(58) Field of Classification Search
None
See application file for complete search history.

(56) References Cited

U.S. PATENT DOCUMENTS

| | | | |
|---|---|---|---|
| 2006/0203924 A1 | 9/2006 | Casaccia et al. | |
| 2007/0190997 A1 | 8/2007 | Moon et al. | |

(Continued)

FOREIGN PATENT DOCUMENTS

| | | | | |
|---|---|---|---|---|
| JP | WO 2012127591 A1 * | 9/2012 | ............ | H04W 72/08 |
| KR | 10-2010-0110753 | 10/2010 | | |
| WO | WO 2012127591 A1 * | 9/2012 | ............ | H04W 72/08 |

*Primary Examiner* — Chi H Pham
*Assistant Examiner* — Vladislav Agureyev
(74) *Attorney, Agent, or Firm* — Nelson Mullins Riley & Scarborough LLP (57) ABSTRACT

There are provided a device-to-device communication method, a mobile device using the same, and a device-to-device communication control method. The device-to-device communication method according to the invention may include receiving device-to-device communication resource allocation information and transmission characteristics information for device-to-device communication from a base station, and performing direct communication with an opposite terminal using the transmission characteristics information for device-to-device communication and the device-to-device communication resource allocation information, in which the transmission characteristics information includes the number of redundancy versions to be transmitted within at least one consecutive transmission time interval (TTI).

2 Claims, 10 Drawing Sheets

(56) References Cited

U.S. PATENT DOCUMENTS

| | | | |
|---|---|---|---|
| 2008/0267129 A1* | 10/2008 | Torsner et al. | 370/331 |
| 2009/0257408 A1* | 10/2009 | Zhang et al. | 370/336 |
| 2010/0008348 A1* | 1/2010 | Zhang | H04L 1/1887 370/345 |
| 2011/0055652 A1* | 3/2011 | Park | H04L 1/1819 714/748 |
| 2011/0075611 A1* | 3/2011 | Choi | H04L 1/1819 370/329 |
| 2011/0235586 A1* | 9/2011 | Han | H04B 7/0426 370/328 |
| 2011/0249578 A1* | 10/2011 | Nayeb Nazar | H04L 1/0027 370/252 |
| 2012/0026963 A1 | 2/2012 | Kim et al. | |
| 2012/0106517 A1* | 5/2012 | Charbit et al. | 370/336 |
| 2012/0129540 A1* | 5/2012 | Hakola et al. | 455/450 |
| 2012/0147830 A1* | 6/2012 | Lohr | H04W 72/042 370/329 |
| 2012/0163252 A1 | 6/2012 | Ahn et al. | |
| 2012/0294210 A1* | 11/2012 | Jiang | H04L 1/1887 370/280 |
| 2013/0005377 A1* | 1/2013 | Wang et al. | 455/509 |
| 2013/0195031 A1* | 8/2013 | Hessler | H04L 1/1819 370/329 |
| 2013/0225184 A1* | 8/2013 | Liu | H04W 72/042 455/450 |
| 2013/0230032 A1* | 9/2013 | Lu et al. | 370/336 |
| 2013/0242824 A1* | 9/2013 | Lee | H04L 1/1819 370/281 |
| 2013/0242889 A1* | 9/2013 | Khoryaev | H04W 72/0413 370/329 |
| 2013/0250924 A1* | 9/2013 | Chen | H04L 1/1819 370/336 |
| 2013/0308552 A1* | 11/2013 | Madan | H04L 5/0094 370/329 |
| 2013/0322413 A1* | 12/2013 | Pelletier | H04W 72/1289 370/336 |
| 2013/0343273 A1* | 12/2013 | Barbieri | H04L 1/1822 370/328 |
| 2014/0010105 A1* | 1/2014 | Sakabe | H04W 72/08 370/252 |
| 2014/0098761 A1* | 4/2014 | Lee | H04W 74/006 370/329 |
| 2014/0098782 A1* | 4/2014 | Shirazi | H04J 13/0003 370/330 |
| 2014/0362832 A1* | 12/2014 | Rudolf et al. | 370/336 |
| 2015/0009932 A1* | 1/2015 | Choi et al. | 370/329 |
| 2015/0036476 A1* | 2/2015 | Vos | H04W 72/1278 370/216 |
| 2015/0110038 A1* | 4/2015 | Yang et al. | 370/329 |
| 2015/0117339 A1* | 4/2015 | Siomina et al. | 370/329 |

\* cited by examiner

DEVICE-TO-DEVICE COMMUNICATION METHOD AND MOBILE DEVICE USING THE SAME

CLAIM FOR PRIORITY

This application claims priority to Korean Patent Application No. 2012-0122065 filed on Oct. 31, 2012 in the Korean Intellectual Property Office (KIPO), the entire contents of which are hereby incorporated by reference.

BACKGROUND

1. Technical Field

Example embodiments of the present invention relate to device-to-device communications, and more particularly, a device-to-device communication method, a mobile device using the same, and a device-to-device communication control method.

2. Related Art

Recently, as the use of applications for smart phones, etc. that wirelessly transmit and receive large amounts of data while moving has been increasing, overhead frequency of mobile communications networks has been rapidly increasing, and resulting problems of network failure and service quality degradation have been becoming more serious day by day.

As one solution, technology for providing device-to-device communication between adjacent devices located in the same cell or neighboring cells within a radius of one to two km in a mobile communications system is being considered.

Device-to-device communication (hereinafter referred to as "D2D communication") refers to a communication method in which direct data transmission and reception between two adjacent terminals are performed without a base station. That is, D2D communication technology sets a D2D wireless link through a mobile communication wireless interface using a mobile communication frequency band between adjacent devices, and then directly exchanges data between the devices through the D2D wireless link without a base station.

Such D2D technology provides an increased transmission rate for users located at a cell boundary without increased infrastructure costs, supports cellular network access for devices out of a service area, and aims to increase system capacity by decreasing interference.

Conventional technology, for example, WiFi Direct, Bluetooth, and Zigbee, only supports communication between devices within several hundred meters. However, D2D communication technology enables direct communication between devices located within a radius of one to two km based on long- and mid-range transmission capability provided by a mobile communications wireless interface. The D2D technology in a cellular mobile communications system has advantages such as wider cell coverage and tighter security than conventional technology such as WiFi Direct, Bluetooth, and Zigbee, and thus its importance is being highlighted and it is being standardized in 3GPP.

D2D communication technology has some additional advantages. Since communication between adjacent devices is performed without passing through a network, it is possible to reduce a load of the network. When adjacent devices located at a cell boundary communicate with each other via a base station, only low-speed data transmission is possible. However, when devices communicate directly, high-speed data transmission is possible due to a significantly improved signal environment between adjacent devices. As a result, it is possible to provide users with service with improved performance.

In addition, when adjacent devices located at a cell boundary communicate via a base station, it is necessary for each device to maintain high enough transmission power to reach the base station. However, when devices communicate directly, transmission power can be significantly decreased and battery life can be increased.

However, when retransmission is necessary due to unsuccessful data transmission, since control information needs to be exchanged via the base station, there is a problem in that a control load increases in device-to-device communication when retransmission is performed.

SUMMARY

Accordingly, example embodiments of the present invention are provided to substantially obviate one or more problems due to limitations and disadvantages of the related art.

Example embodiments of the present invention provide a device-to-device communication method that guarantees transmission error recovery.

Example embodiments of the present invention also provide a device-to-device communication control method.

Example embodiments of the present invention also provide a device-to-device communication control device.

Example embodiments of the present invention also provide a mobile device for performing device-to-device communication.

In some example embodiments, a device-to-device communication method includes receiving device-to-device communication resource allocation information and transmission characteristics information for device-to-device communication from a base station, and performing direct communication with an opposite terminal using the transmission characteristics information for device-to-device communication and the device-to-device communication resource allocation information, wherein the transmission characteristics information includes the number of redundancy versions to be transmitted within at least one consecutive transmission time interval (TTI).

The device-to-device communication method may further include measuring a state of a link used for direct communication with the opposite terminal and reporting a result to the base station.

The transmission characteristics information may further include at least one of wireless resources for data transmission in device-to-device communication and a period of validity of the wireless resources, a modulation and coding scheme to be used for transmission, and transmission power data transmission control information.

The performing direct communication with the opposite terminal may include, when the opposite terminal is a transmitting terminal, configuring as many redundancy versions of at least one corresponding transmission block as the number of redundancy versions and arranging the redundancy versions in a corresponding TTI within the at least one consecutive TTI, and transmitting data to the opposite terminal using the device-to-device communication resource allocation information and the transmission characteristics information.

The performing direct communication with the opposite terminal may include, when the opposite terminal is a receiving terminal, receiving data transmitted from the opposite terminal in a resource period indicated by the direct communication resource allocation information.

The device-to-device communication method may further include combining at least one redundancy version received in the at least one consecutive TTI using the device-to-device communication resource allocation information and the transmission characteristics information for device-to-device communication.

The measuring the state of a link used to perform direct communication with the opposite terminal and reporting the result to the base station may be performed periodically or in response to a request from the base station.

In other example embodiments, a device-to-device communication control method includes receiving a data transmission request from a first terminal to a second terminal through device-to-device communication, determining transmission characteristics for direct communication between the first and second terminals based on a link state between the first and second terminals, and respectively transmitting transmission control information including the transmission characteristics and reception control information including the transmission characteristics to the first and second terminals, wherein the transmission characteristics information includes the number of redundancy versions to be transmitted within one TTI.

The device-to-device communication control method may further include re-determining the transmission characteristics for direct communication between the first and second terminals when link adaptation is necessary or a period of validity of resources for device-to-device communication allocated to the first and second terminals has expired based on a result of analyzing a state measurement report of a device-to-device communication link from at least one of the terminals.

The device-to-device communication control method may further include receiving a measurement report on a link state between the first and second terminals from at least one of the first and second terminals.

In still other example embodiments, a mobile device includes a wireless transmission and reception unit configured to receive device-to-device communication resource allocation information and transmission characteristics information for device-to-device communication from a base station, and a control unit configured to determine transmission and reception parameters for performing direct communication with an opposite terminal and control the wireless transmission and reception unit accordingly using the device-to-device communication resource allocation information and the transmission characteristics information for device-to-device communication, wherein the transmission characteristics information includes the number of redundancy versions to be transmitted within the at least one consecutive TTI.

The control unit may perform control such that as many redundancy versions of at least one corresponding transmission block as the number of redundancy versions are configured and the wireless transmission and reception unit transmits the redundancy versions of the corresponding transmission block within the at least one consecutive TTI.

The control unit may measure a state of a link used for direct communication with the opposite terminal and report a result to the base station.

The wireless transmission and reception unit may receive data transmitted from the opposite terminal in a resource period indicated by the device-to-device communication resource allocation information.

According to the invention, since control of the base station is minimized and data transmission errors over the D2D link are recovered from, it is possible to decrease complexity of the cellular network due to D2D communication and prevent degradation of overall system performance.

Moreover, according to the invention, in consideration of close-range communication and less drastic quality changes in the D2D communication link, which are characteristics of D2D communication, excessive control procedures applied in conventional methods due to cellular communication characteristics are removed, and the transmission characteristics of the D2D link are reflected. As a result, it is possible to improve terminal and base station efficiency.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

While the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, numbers, steps, operations, elements, and/or components, but do not preclude the presence or addition of one or more other features, numbers, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

The term "terminal" used in the present specification may refer to a mobile station (MS), user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terminals. Various embodiments of the terminal may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music-storing/playing electronics product having a wireless communication function, an Internet-enabled electronics product enabling wireless Internet access and browsing, and a portable unit or terminals integrating combinations of corresponding functions, but the terminal is not limited to these examples.

The term "cell," or "base station" used in the present specification may generally denote a fixed or moving point for communication with the terminal, and may also be referred to as a base station, node-B, eNode-B, base transceiver system (BTS), access point, relay, and femto-cell.

Hereinafter, exemplary embodiments of the invention will be described in detail with reference to the accompanying drawings. Parts of the exemplary embodiments are consistently denoted by the same reference numerals throughout the drawings and detailed description and each part is only described once.

Figure 1:
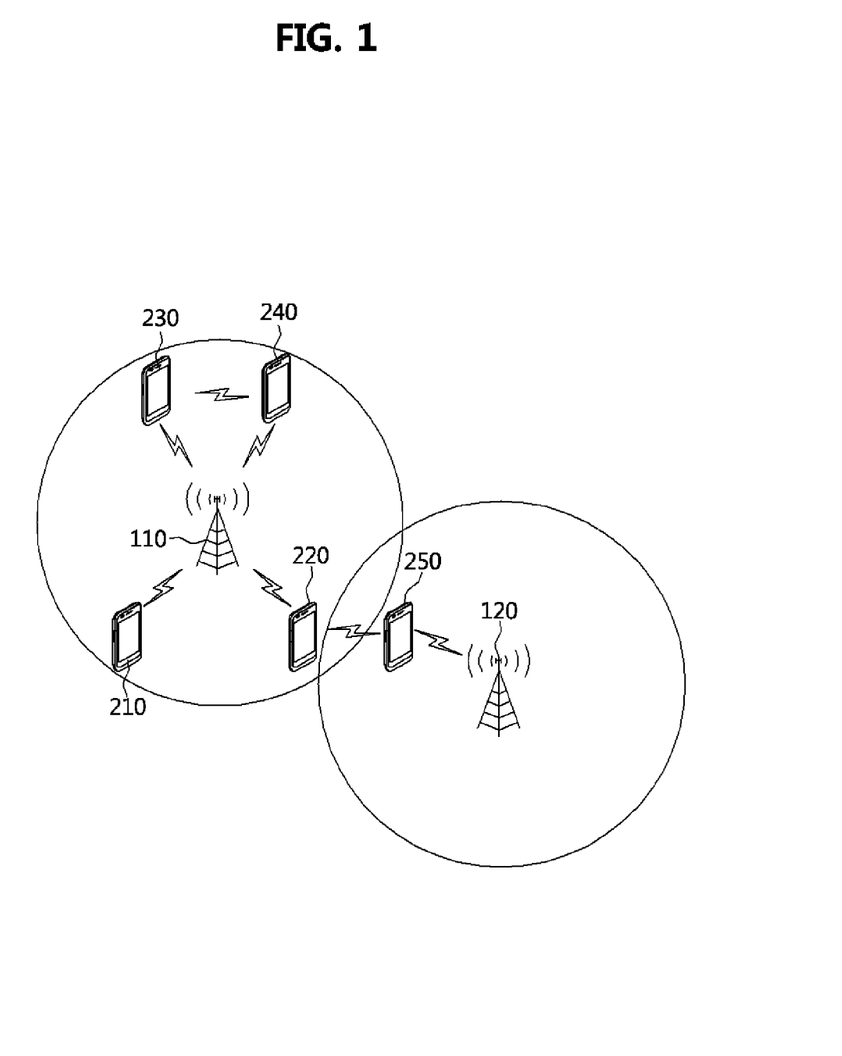
FIG. 1 is a conceptual diagram illustrating a concept of device-to-device communication.

FIG. 1 is a conceptual diagram illustrating a concept of device-to-device communication.

As illustrated in FIG. 1, there is provided a cellular communication network that includes first and second base stations 110 and 120.

Devices 1 and 2 210 and 220 belonging to a cell generated by the first base station communicate over a general access link via the first base station. However, although devices 3 and 4 230 and 240 belong to the first base station, the devices perform data transmission and reception directly with each other without the base station.

Such device-to-device communication can be efficiently used in many cases. For example, device-to-device communication can be used in a local media server that provides a large volumes of data to visitors who attend concerts.

Referring to FIG. 1 again, it is understood that a D2D link is available not only between devices having the same cell as a serving cell but also between devices having different cells as the serving cell. That is, in FIG. 1, the device 2 220 belonging to the first base station 110 performs D2D communication with a device 5 250 belonging to the second base station 120.

Such device-to-device communication includes a centralized control D2D communication method and a distributed control D2D communication method.

In the centralized control D2D communication method, a device that want to communicate with another device requests link setting from a central node (a base station in the cellular network) that performs control, and the central node allocates wireless resources for device-to-device communication and enables communication between devices when an opposite terminal is present in the vicinity of the device.

In this case, most of the operations performed in the device are managed by the central node. Wireless resources allocated for a cellular link or another D2D link can be reused for D2D communication.

Meanwhile, the distributed control D2D communication method is not dependent on one central control node, sets a link in a distributed control method through direct signal exchanges between devices, and directly exchanges data with a nearby device using the link.

A method according to embodiments of the invention may be more appropriately applied to the centralized control method than the distributed control method.

Figure 2:
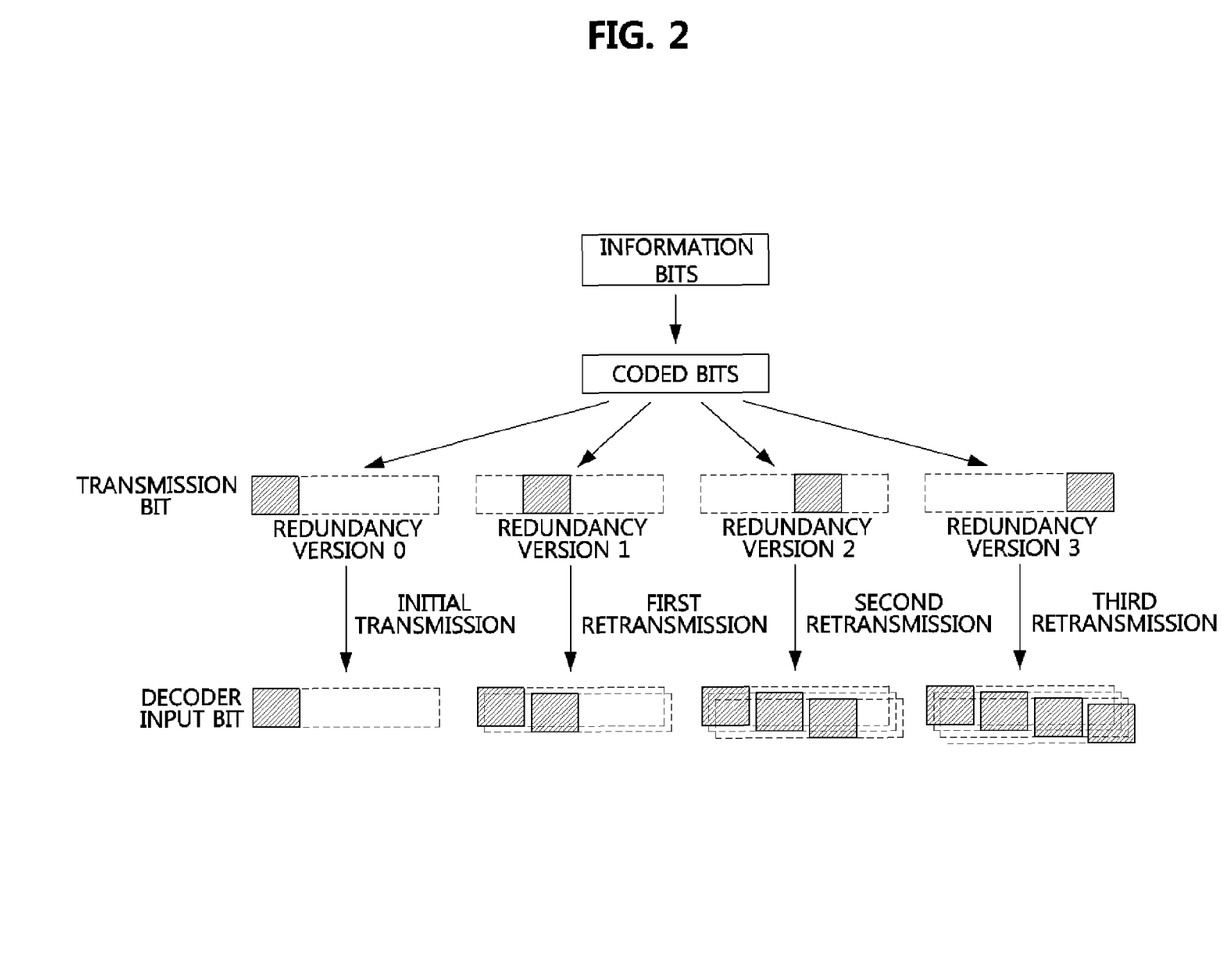
FIG. 2 is a conceptual diagram illustrating an incremental redundancy HARQ based on an LTE-Advanced system.

FIG. 2 is a conceptual diagram illustrating an incremental redundancy HARQ based on an LTE-Advanced system.

As a method of recovering from errors generated in a wireless link, a cellular mobile communications system uses a hybrid ARQ (HARQ) that combines forward error correction and automatic repeat request (ARQ). In the HARQ, when a transmitting end transmits data, a receiving end (base station or terminal) receives the data and then delivers ACK/NACK to indicate whether the transmitted data was received or not to the transmitting end.

When errors are generated, the receiving end does not discard a received packet but rather stores the packet in a buffer and then makes one packet by combining the packet with a retransmitted packet. In this case, the one combined packet has higher reliability than either of its component packets (the initially transmitted packet and the retransmitted packet) due to an increased amount of information by combining. In general, each retransmitted packet is not necessarily the same as the initially transmitted packet and retransmission is performed using bit sets that are coded differently from previous transmissions.

Since an additional parity bit that is not included in a previous transmission attempt can be included in retransmission, as retransmission is performed, a final code rate is generally decreased and thereby coding becomes stronger.

Bits transmitted in initial transmission or retransmission with respect to the same information bit are referred to as a redundancy version. The LTE-Advanced system can use four redundancy versions. FIG. 2 illustrates a concept of a retransmission method using four redundancy versions. All redundancy versions do not have the same importance, the initial transmission needs to include at least all systematic bits and some parity bits, and parity bits not transmitted in the initial transmission are included in retransmission.

However, in order to apply this conventional incremental redundancy HARQ to D2D communication based on cellular mobile communications under control of a base station, there are constraints described below. The constraints increase control complexity in the base station and device.

Figure 3:
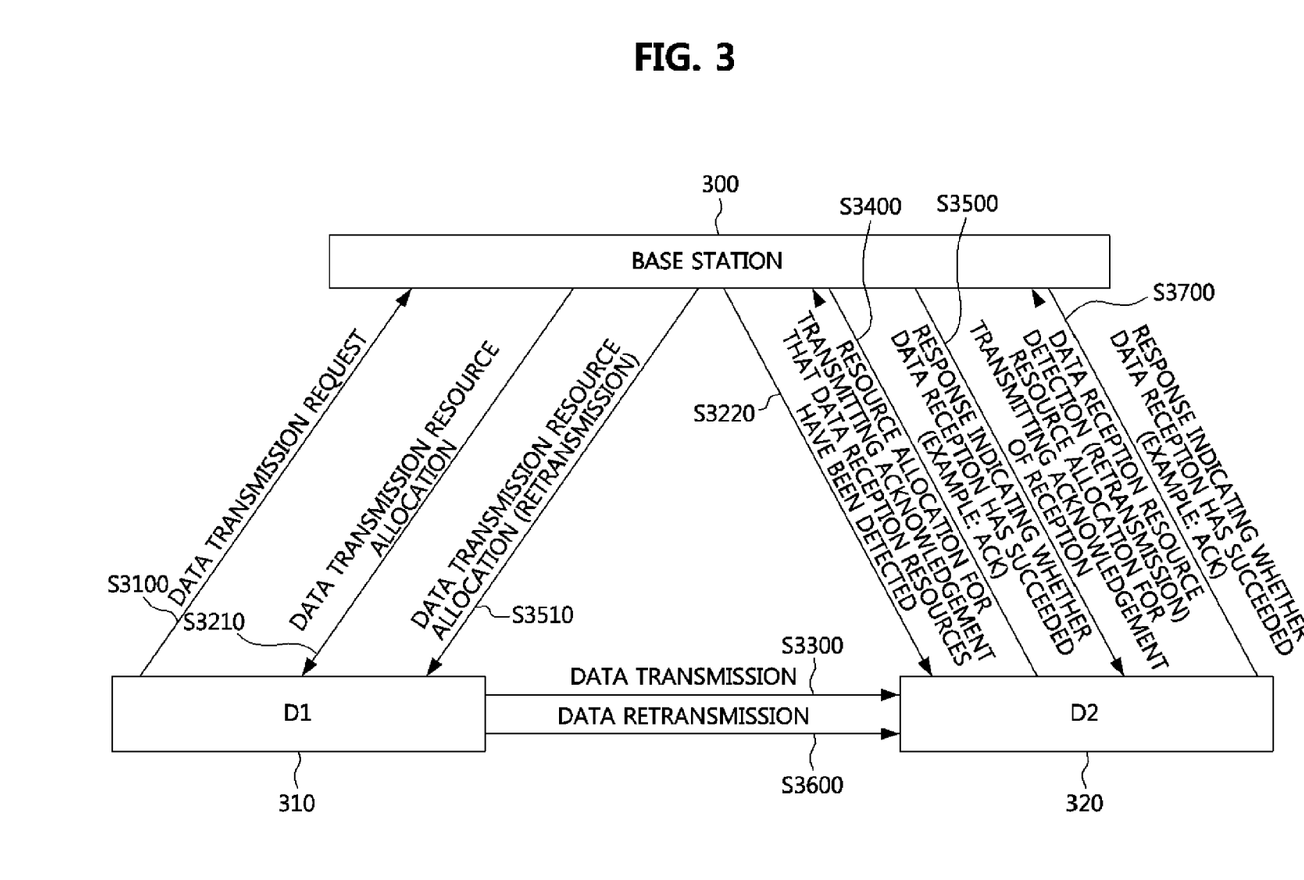
FIG. 3 is a flowchart illustrating operations of a terminal and a base station for D2D communication when an HARQ retransmission method is applied.

FIG. 3 is a flowchart illustrating operations of a base station and a device for D2D communication when an HARQ retransmission method is applied.

As illustrated in FIG. 3, when the device 1 310 requests D2D data transmission from a base station 100 (S3100), the base station 300 that has received the request allocates resources for D2D, transmits control information about data transmission resource allocation to the device 1 310 serving as a transmitting terminal (S3210), and transmits allocation information about resources for transmitting acknowledgement that data reception resources have been detected to the device 2 320 serving as a receiving terminal (S3220). Then, D2D data transmission from the device 1 310 to the device 2 320 is performed (S3300). When the device 2 320 fails to receive transmitted data, a response indicating whether data reception has succeeded is set as NACK and transmitted to the base station 300, not the device 1 310 (S3400). The base station allocates resources for retransmission, transmits control information about data transmission resource allocation for retransmission to the device 1 310 serving as the transmitting terminal (S3510), and transmits allocation information about resources for transmitting acknowledgement that data reception resources have been detected to the device 2 320 serving as the receiving terminal for retransmission (S3500).

Then, data retransmission is performed from the device 1 310 to the device 2 320 (S3600). When the device 2 320 successfully receives retransmitted data, a response indicating whether data reception has succeeded is set as ACK and transmitted to the base station (S3700).

In this way, in D2D communication based on cellular mobile communication, data communication is performed between devices, and the base station allocates resources and time for data communication between devices.

A receiving device detects data transmission error checks (ACK/NACK determination) in a D2D communication wireless link. However, when the base station detects the data transmission error checks, subsequent data transmission is decided (for new data transmission or retransmission) and resources for D2D communication can be allocated.

Therefore, whenever data transmission between devices is performed, the base station allocates resources for data transmission to the device serving as the transmitting end, allows the resources allocated to the transmitting device to be detected by the device serving as the receiving end for data reception, and needs to allocate resources for ACK/NACK feedback. These operations need to be performed for initial transmission and each retransmission of a transmission block.

As described above, when data retransmission is performed in device-to-device communication, it is understood that complex control message exchange operations connected with the base station are necessary. FIG. 3 illustrates a case in which retransmission is performed once when the conventional HARQ is applied to D2D communication. When retransmission is performed a maximum of four times based on LTE-Advanced specifications, complexity is significantly increased.

In summary, the cellular mobile communications system uses the HARQ to handle errors in a wireless link. In D2D communication based on the cellular mobile communications system, in order to handle errors generated in a D2D communication link and to perform efficient data transmission, retransmission between two devices is also necessary.

However, in order to apply the conventional retransmission method HARQ to D2D communication, the base station that allocates resources for D2D communication needs to receive HARQ ACK/NACK feedback. As a result, there is a problem in that complexity of resource allocation and control increases.

Accordingly, in order to increase transmission reliability in device-to-device communication, the invention provides an error recovery method that is different from the existing retransmission method.

Figure 4:
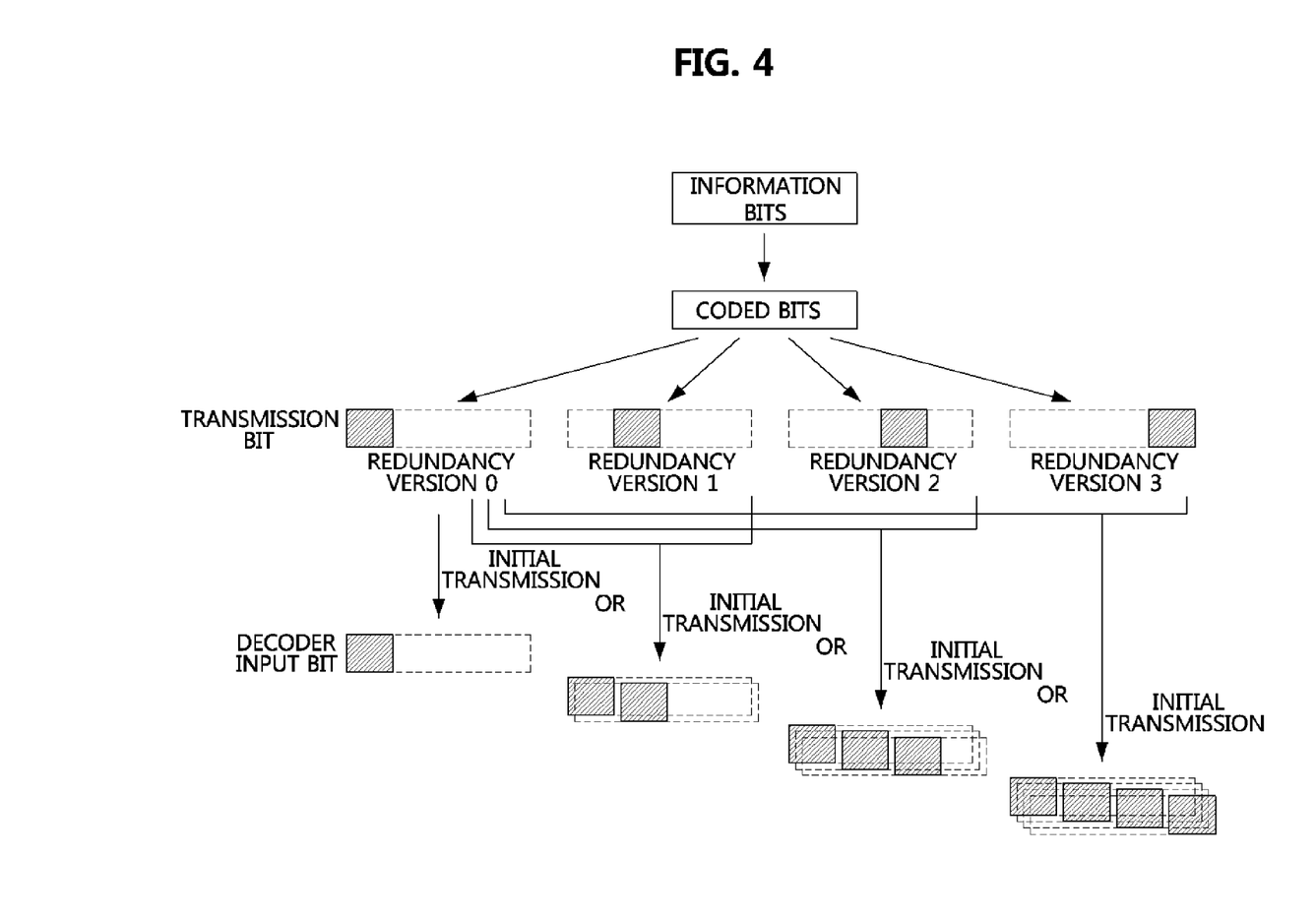
FIG. 4 is a conceptual diagram illustrating redundancy combining for device-to-device communication according to an embodiment of the invention.

FIG. 4 is a conceptual diagram illustrating redundancy combining for device-to-device communication according to an embodiment of the invention.

As illustrated in FIG. 4, according to the number of redundancy versions, different redundancy versions from 0 to 3 are transmitted through consecutive TTIs in initial transmission, not retransmission. When there is one redundancy version, the redundancy version 0 is transmitted in the initial transmission. Where there are two redundancy versions, the two consecutive redundancy versions 0 and 1 are transmitted in two consecutive TTIs. When there are three redundancy versions, corresponding redundancy versions are transmitted in three consecutive TTIs, and when there are four redundancy versions, corresponding redundancy versions are transmitted in four consecutive TTIs.

The receiving terminal that receives at least one redundancy version transmitted from the transmitting terminal performs reception processing by combining at least one of the received redundancy versions.

That is, according to the exemplary embodiment of the invention, in order to increase transmission reliability of device-to-device communication, a redundancy combining concept is used instead of retransmission.

According to the invention, a device for performing D2D communication based on cellular mobile communication recovers from transmission errors using TTI bundling without ACK/NACK feedback. Here, in a MAC layer of an LTE/LTE-A, scheduling and transmission are performed in units of TTIs. A single TTI may include one or more transport blocks.

Figure 5:
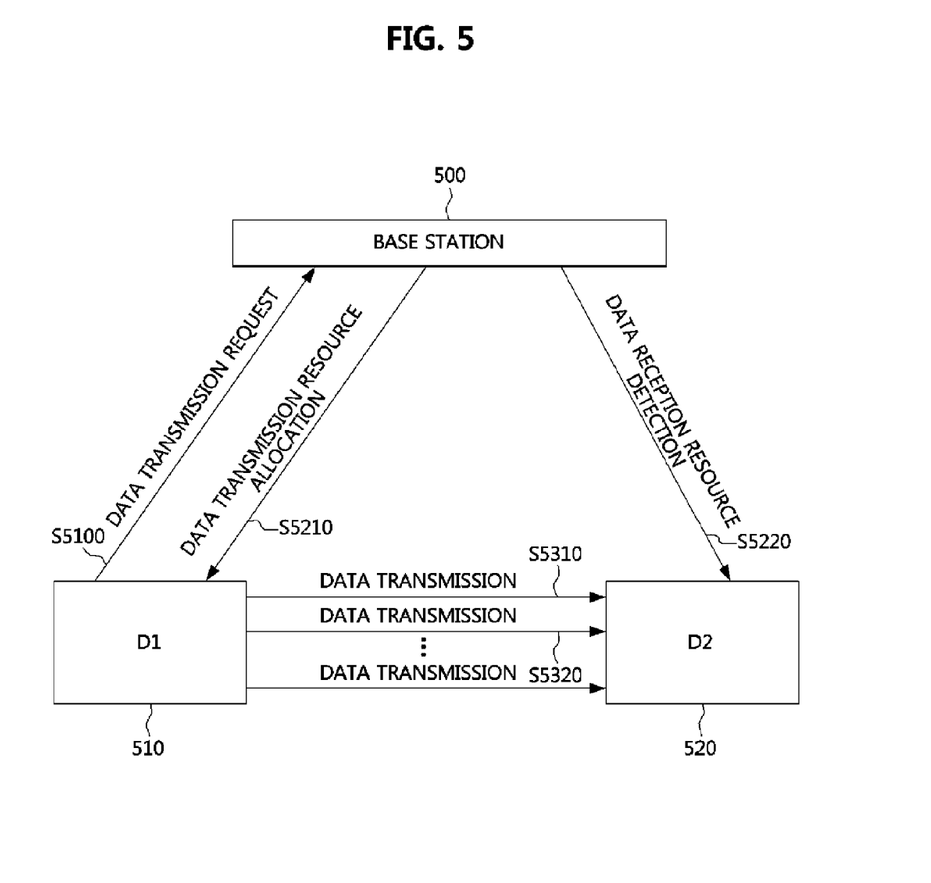
FIG. 5 is a schematic diagram illustrating an operation flow between a base station and a terminal in a device-to-device communication method according to an embodiment of the invention.

FIG. 5 is a schematic diagram illustrating an operation flow between a base station and a terminal in a device-to-device communication method according to an embodiment of the invention.

As illustrated in FIG. 5, when the device 1 510 requests D2D data transmission from the base station 500 (S5100), the base station 500 that has received the request allocates resources for D2D, transmits control information about data transmission resource allocation to the device 1 510 serving as the transmitting terminal (S5210), and transmits allocation information about resources for transmitting acknowledgement that data reception resources have been detected to the device 2 520 serving as the receiving terminal (S5220). Then, D2D data transmission from the device 1 510 to the device 2 520 is performed (S5310 and S5320).

As illustrated in FIG. 5, in the D2D data transmission method according to the invention, when data reception fails, there is no retransmission procedure. As alternatives, as illustrated in FIG. 4, since at least one redundancy version is transmitted in data transmission, error recovery can be made in the receiving end and the same effect as retransmission can be obtained. It is also understood that the control complexity is significantly decreased compared to the conventional retransmission operation flowchart illustrated in FIG. 3.

Data transmission in D2D communication according to an embodiment of the invention will be described in detail with reference to sequence diagrams of FIGS. 6 and 7.

Figure 6:
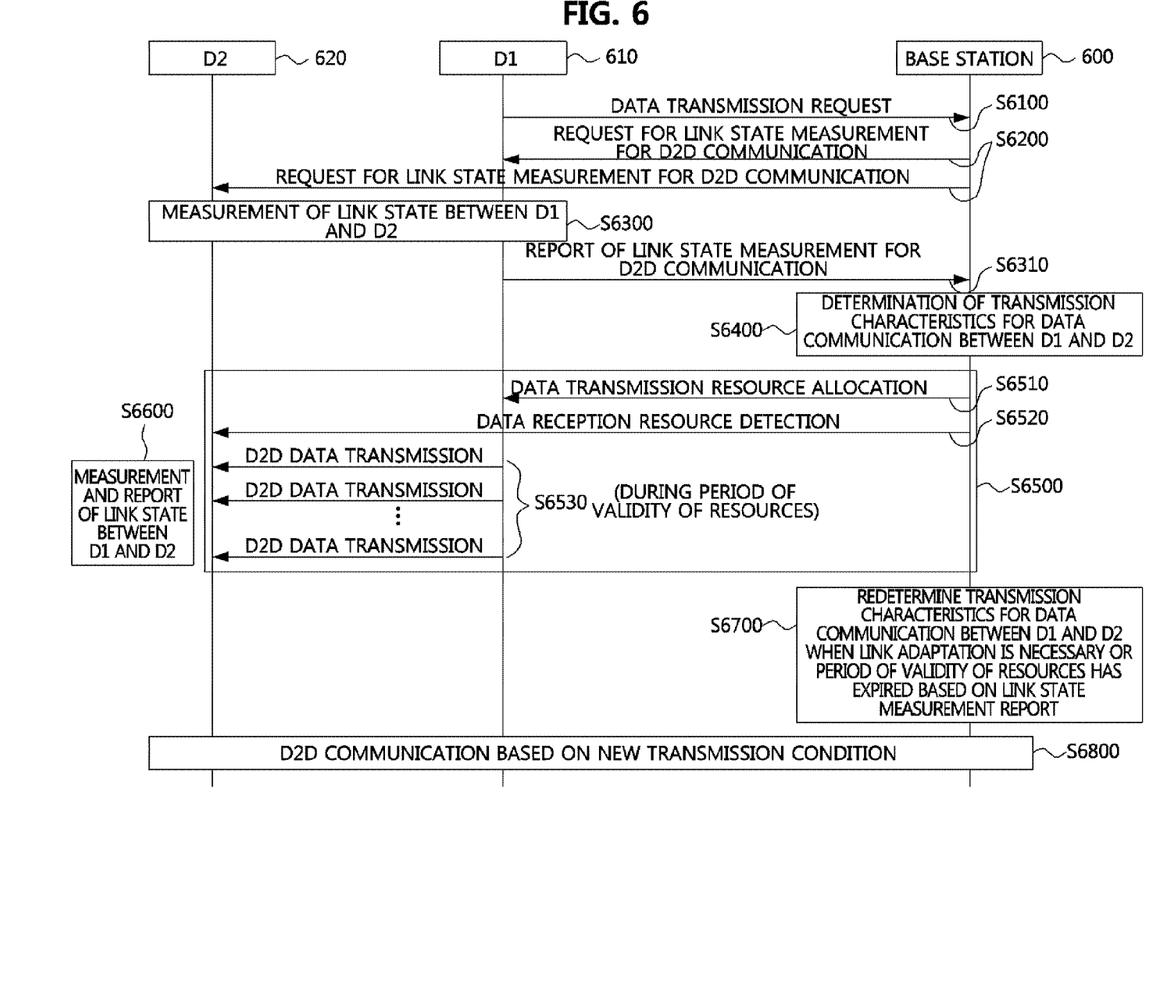
FIG. 6 is a sequence diagram illustrating detailed operations of a base station and a terminal in a device-to-device communication method according to an embodiment of the invention.

FIG. 6 is a sequence diagram illustrating detailed operations of a base station and a terminal in a device-to-device communication method according to an embodiment of the invention.

FIG. 6 illustrates a sequence of operations in a case in which link measurement is performed and device-to-device communication is performed when D2D communication between devices is requested.

When the device 1 610 requests D2D data transmission from the base station 600 (S6100), the base station 600 that has received the request requests measurement and a report of a link state from two devices that want to perform D2D communication (for example, data transmission from D1 to D2) (S6200).

The devices D1 610 and D2 620 that have received the request for measurement and report of the link state from the base station measure the link state between the two devices (S6300) and report a result to the base station (S6310). The base station 600 to which the D2D link state has been reported determines transmission characteristics parameters for data transmission from D1 to D2 based on measurement information of the link state (S6400). Here, according to an exemplary embodiment of the invention, the transmission characteristics parameters may include the following:

- wireless resources for data transmission and a period of validity of the wireless resources (corresponding wireless resources are used to transmit data from D1 to D2 during the period of validity);
- a modulation and coding scheme (MCS) to be used for data transmission;
- transmission power control (TPC) information for data transmission; and
- the number of redundancy versions to be transmitted in consecutive TTIs (for example, when the number of redundancy versions is 2, the redundancy versions 0 and 1 are transmitted in consecutive TTIs. That is, data corresponding to the number of redundancy versions including the redundancy 0 is transmitted).

Based on the determined parameters, the base station 600 transmits the parameters and data transmission control information including data transmission resource allocation information to the D1 610 serving as the transmitting device (S6510), and transmits data reception control information for data reception resource detection including the parameters to the D2 620 serving as the receiving device (S6520).

The transmitting device D1 610 that has received the data transmission control information from the base station configures redundancy versions of a corresponding transmission block in consecutive TTIs, the number of configured redundancy versions equaling the number of redundancy versions included in the data transmission control information, and transmits the result to the receiving device (S6530). In this case, the D2D data transmission is performed during a period of validity of resources allocated in the base station.

When the period of validity has expired, the transmission parameters for D2D data transmission are re-determined. On the other hand, although the period of validity of resources has not expired, when it is determined that data transmission environment changes are required based on link state measurement information (S6600) collected during data transmission, the parameters are re-determined (S6700). Here, when the period of validity has expired, redetermination of the parameters is also performed based on the link state measurement information collected during data transmission. When the parameters for data transmission from D1 to D2 are changed, the base station performs data transmission control settings based on the changed parameters and the device performs data transmission based on the settings.

That is, when the transmission parameters for D2D data transmission are re-determined, D2D communication according to new transmission conditions is performed (S6800). In operation 6800, the same operations as in operation 6500, including operations 6510 to 6530, are performed.

Meanwhile, the receiving device D2 620 that has received the data reception control information from the base station combines the redundancy version(s) transmitted in consecutive TTIs based on the data reception control information.

In this case, according to the invention, since the receiving device does not perform ACK/NACK feedback with regard to reception, there is no retransmission procedure.

Figure 7:
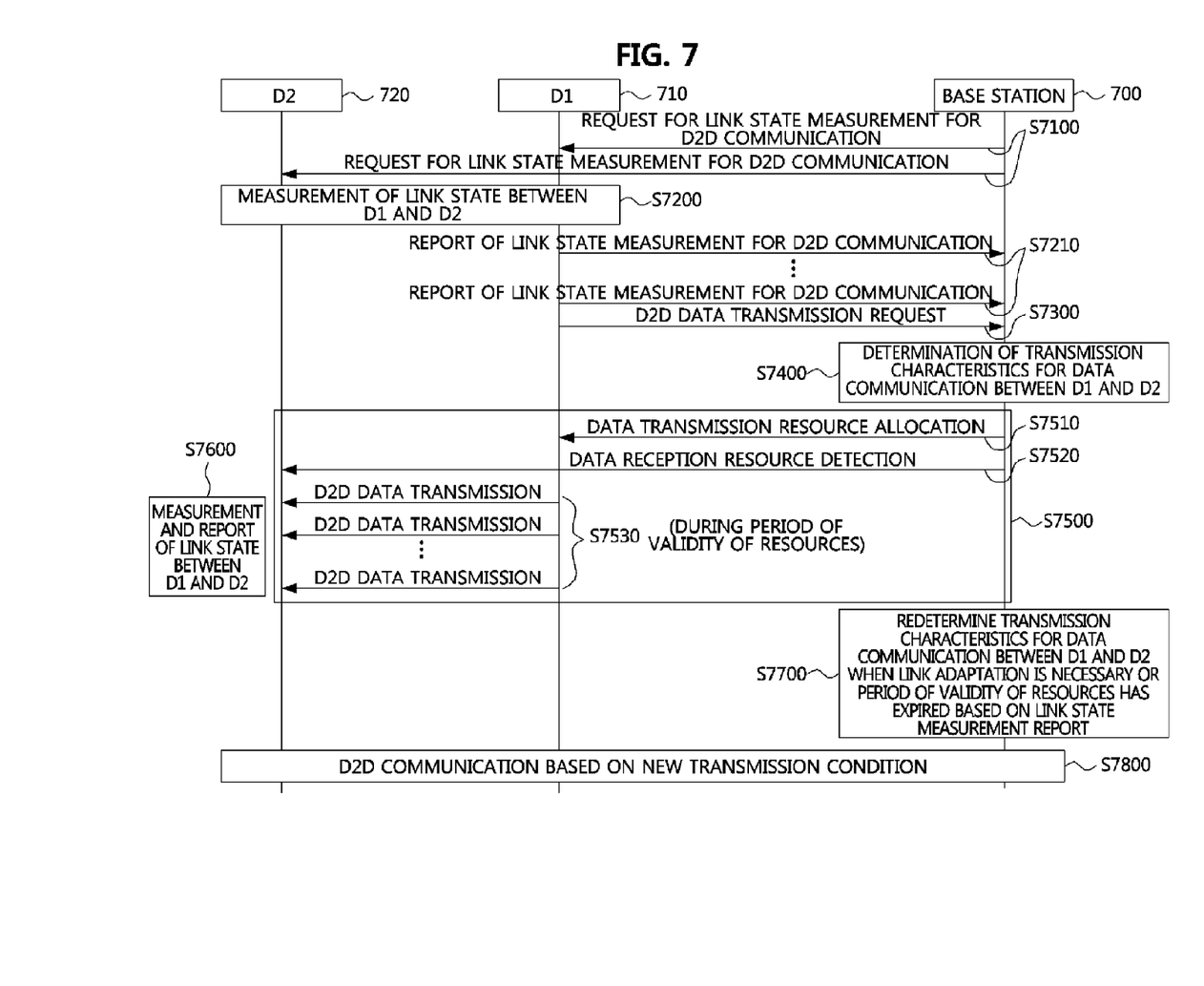
FIG. 7 is a sequence diagram illustrating detailed operations of a base station and a terminal in a device-to-device communication method according to an embodiment of the invention.

FIG. 7 is a sequence diagram illustrating detailed operations of a base station and a terminal in a device-to-device communication method according to an embodiment of the invention.

FIG. 7 illustrates an embodiment in which a method according to the invention is applied when D2D link measurement between devices is performed.

The operations according to the embodiment of FIG. 7 are basically the same as those of FIG. 6. However, the link measurement between devices is already performed. Therefore, the basic effects of the invention are the same as in the embodiment of FIG. 6 except that a data transmission request (S7300) of the transmitting device D1 710 in D2D communication is performed after a link state measurement request (S7100) and measurement report operations (S7200 and S7210).

Figure 8:
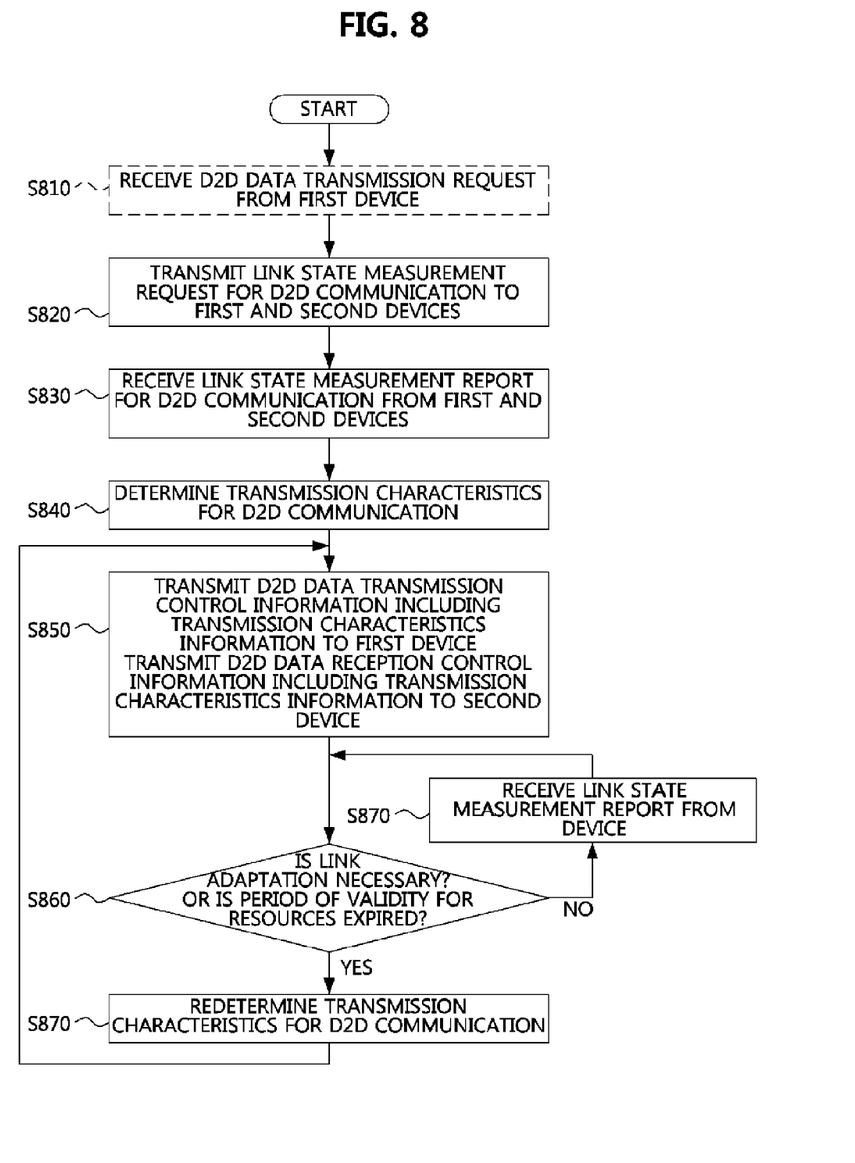
FIG. 8 is a flowchart illustrating operation of a device-to-device communication control method according to an embodiment of the invention.

FIG. 8 is a flowchart illustrating operation of a device-to-device communication control method according to an embodiment of the invention.

The control method of FIG. 8 can be performed by a device-to-device communication control device. A base station may be taken as a representative example of the device-to-device communication control device.

First, the base station receives a D2D data transmission request from a first device (S810). Alternatively, operation S810 may be performed later. According to an embodiment of the invention illustrated in FIG. 7, operation S810 may be performed after an operation (S830) described below of receiving a link state measurement report from the device.

The base station that has received the D2D data transmission request from the first device transmits the link state measurement request for D2D communication to the first and second terminals (S820). The link state measurement report for D2D communication is received from the first and second terminals (S830), and transmission characteristics for D2D communication is determined (S840).

Then, the base station transmits D2D data transmission control information including transmission characteristics information to the first device, and transmits D2D data reception control information including transmission characteristics information to the second device (S850).

In the device-to-device communication control method according to the invention, while device-to-device communication is performed, the link state measurement report is received from the device periodically or in response to a request of the base station (S870), and it is continuously checked whether D2D link adaptation is necessary or the period of validity of resources allocated for device-to-device communication has expired (S860). When link adaptation is necessary or the period of validity of resources has expired, the transmission characteristics for device-to-device communication are re-determined (S880), and optimal transmission environments are provided to devices that perform direct communications by repeating the above-described operation 850.

Figure 9:
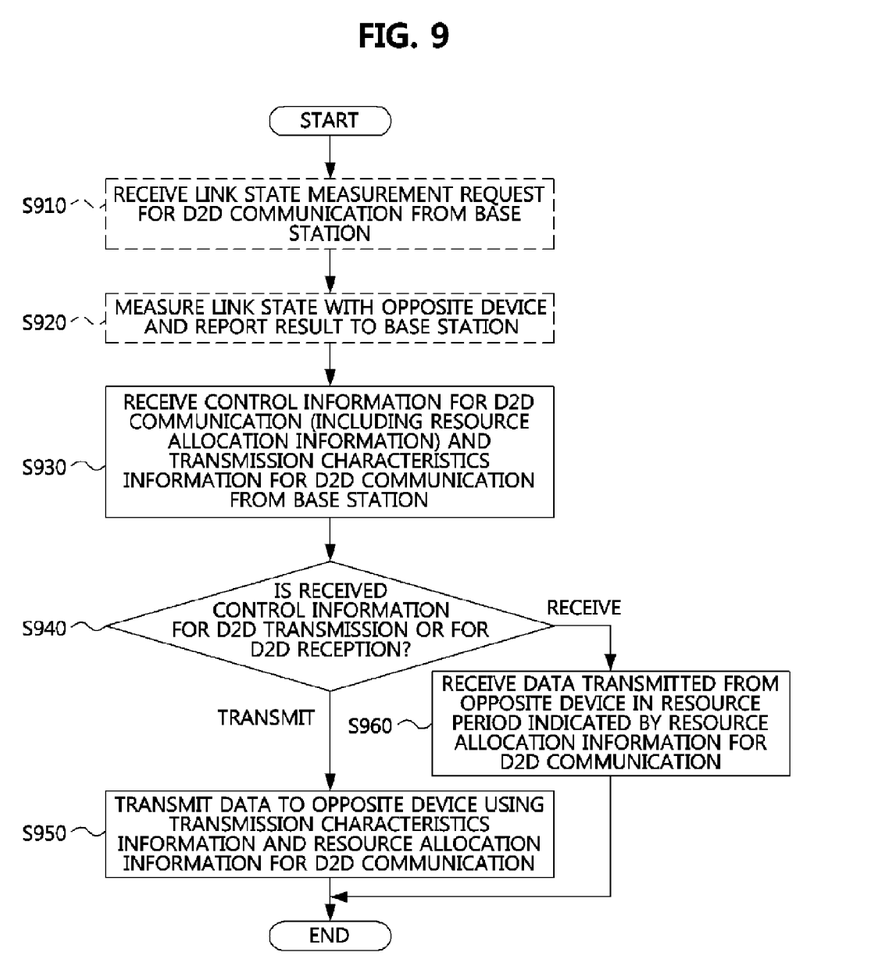
FIG. 9 is a flowchart illustrating operation of a device-to-device communication method according to an embodiment of the invention.

FIG. 9 is a flowchart illustrating operation of a device-to-device communication method according to an embodiment of the invention.

The device that wants to perform device-to-device communication receives the link state measurement request for D2D communication from the base station (S910), measures a link state with an opposite device for D2D communication, and reports a result to the base station (S920). Here, when the device is already performing device-to-device communication, operation 910 may be omitted.

Then, the device receives transmission characteristics information for direct communication with the opposite device and control information (including resource allocation information) for direct communication between devices from the base station (S930).

The device determines whether the received control information is D2D transmission control information or D2D reception control information (S940).

When the corresponding device is the transmitting device, data is transmitted to the opposite device using the transmission characteristics information and the direct communication resource allocation information received from the base station (S950). In this case, the transmitting device configures redundancy versions of the corresponding transmission block in consecutive TTIs, the number of configured redundancy versions equaling the number of redundancy versions included in the data transmission control information, and transmits the result to the receiving device.

On the other hand, when the corresponding device is the receiving device, data transmitted from the opposite device is received in a resource period that is indicated by the direct communication resource allocation information (S960). The receiving device combines the redundancy versions transmitted in consecutive TTIs based on the data reception control information.

Figure 10:
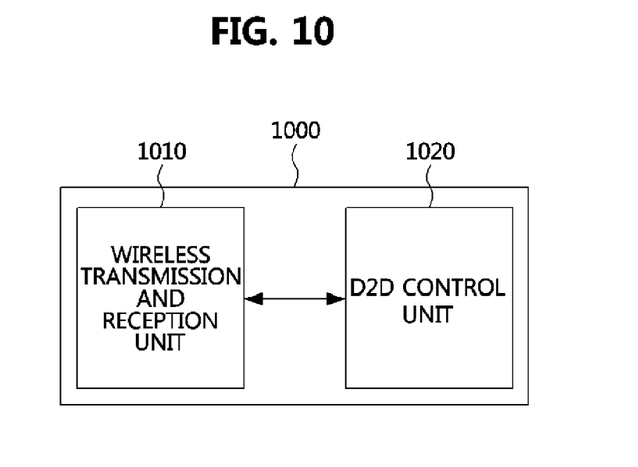
FIG. 10 is a block diagram illustrating a configuration of a device-to-device communication control device that controls device-to-device communication according to the invention.

FIG. 10 is a block diagram illustrating a configuration of a device-to-device communication control device that controls device-to-device communication according to the invention.

A base station may be a representative example of the device-to-device communication control device in FIG. 10.

The device-to-device communication control device 1000 according to the invention may include a D2D control unit 1020 and a wireless transmission and reception unit 1010.

The wireless transmission and reception unit 1010 receives a data transmission request from the transmitting terminal to the receiving terminal through device-to-device communication. The wireless transmission and reception unit 1010 also receives a report on a D2D link state measurement value from at least one terminal.

The D2D control unit 1020 performs control such that transmission characteristics for direct communication between the first and second terminals based on the link state between the first and second terminals are determined, and controls the wireless transmission and reception unit 1010 such that transmission control information including the transmission characteristics and reception control information including the transmission characteristics are respectively transmitted to the transmitting terminal and receiving terminal. In this case, the transmission characteristics information includes the number of redundancy versions to be transmitted within one TTI.

Based on a result of analyzing the report on the state measurement of the device-to-device communication link from at least one terminal, when link adaptation is necessary or a period of validity of resources for device-to-device communication allocated to the first and second terminals has expired, the D2D control unit 1020 re-determines the transmission characteristics for direct communication between the first and second terminals.

Figure 11:
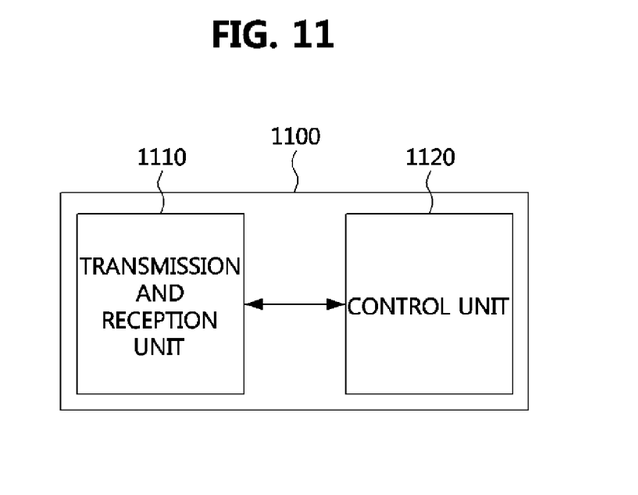
FIG. 11 is a block diagram illustrating a configuration of a device for performing device-to-device communication.

FIG. 11 is a block diagram illustrating a configuration of a device for performing device-to-device communication.

The device 1100 according to the invention may include a wireless transmission and reception unit 1110 and a control unit 1120.

The wireless transmission and reception unit 1110 receives device-to-device communication resource allocation information and transmission characteristics information for device-to-device communication from the base station. The control unit 1120 determines transmission and reception parameters for performing direct communication with the opposite terminal using the device-to-device communication resource allocation information and the transmission characteristics information for device-to-device communication and controls the wireless transmission and reception unit 1110 based on the parameters.

When the corresponding device is the transmitting terminal, the control unit 1120 performs control such that as many redundancy versions of at least one corresponding transmission block as the number of redundancy versions are configured, and the wireless transmission and reception unit 1110 transmits the redundancy versions of the corresponding transmission block in the at least one consecutive TTI.

On the other hand, when the corresponding device is the receiving terminal, the control unit 1120 combines at least one redundancy version received in the at least one consecutive TTI.

A transmission error recovery method of guaranteeing efficient data transmission in D2D communication based on cellular mobile communication according to the invention has been described.

According to the invention, since control of the base station is minimized and data transmission errors over the D2D link are recovered from, it is possible to reduce complexity of the cellular network due to D2D communication and prevent degradation of overall system performance.

Moreover, according to the invention, in consideration of close-range communication and less drastic quality changes in the D2D communication link, which are characteristics of D2D communication, excessive control procedures applied in conventional methods due to cellular communication characteristics are removed, and the transmission characteristics of the D2D link are reflected. As a result, it is possible to improve terminal and base station efficiency.

While example embodiments of the present invention and their advantages have been described in detail, it should be understood that various changes, substitutions and alterations may be made to the example embodiments without departing from the scope of the invention as defined by the following claims.

What is claimed is:

1. A device-to-device (D2D) communication method performed by a first terminal, the method comprising:
receiving, from a base station, transmission characteristics information including a valid period in which a D2D communication is permitted and wireless resources which are available for the D2D communication and are configured in the valid period; and transmitting, to a second terminal, a redundancy version (RV) #0, a RV #1, a RV #2 and a RV #3 of a transport block using consecutive D2D transmission time intervals (TTIs) which are configured in the wireless resources of the valid period, without hybrid automatic repeat-request acknowledge/negative acknowledge (HARQ ACK/NACK) response from the second terminal or the base station, wherein the RV #0, the RV #1, the RV #2, and the RV #3 are combined to recover error in decoding the transport block by the second terminal, and wherein a HARQ ACK/NACK feedback response procedure with regard to reception of the RV #0, the RV #1, the RV #2, and the RV #3 is not performed in the second terminal in the valid period.

2. A device-to-device (D2D) communication method performed by a second terminal, the method comprising:

receiving, from a base station, transmission characteristics information including a valid period in which a D2D communication is permitted and wireless resources which are available for the D2D communication and are configured in the valid period; and receiving, from a first terminal, a redundancy version (RV) #0, a RV #1, a RV #2, and a RV #3 of a transport block using consecutive D2D transmission time intervals (TTIs) which are configured in the wireless resources of the valid period, without hybrid automatic repeat-request acknowledge/negative acknowledge (HARQ ACK/NACK) response to the first terminal or the base station, wherein the second terminal combines the RV #0, the RV #1, the RV #2, and the RV #3 to recover error in decoding the transport block, and wherein a HARQ ACK/NACK feedback response procedure with regard to reception of the RV #0, the RV #1, the RV #2, and the RV #3 is not performed in the second terminal in the valid period.

* * * * *